United States Patent [19]
Alvarez, Jr. et al.

[11] Patent Number: 6,059,859
[45] Date of Patent: May 9, 2000

[54] METHOD, COMPOSITION AND APPARATUS FOR WATER REMOVAL FROM NON-CORROSIVE GAS STREAMS

[75] Inventors: Daniel Alvarez, Jr., San Diego; Jeffrey J. Spiegelman, La Jolla, both of Calif.

[73] Assignee: Aeronex, Inc., San Diego, Calif.

[21] Appl. No.: 08/933,668

[22] Filed: Sep. 19, 1997

[51] Int. Cl.[7] ............................. B01D 53/04; B01D 53/26
[52] U.S. Cl. .................... 95/117; 95/118; 96/131; 96/134; 96/153; 96/154
[58] Field of Search ............... 95/117–126; 96/108, 96/121, 130–135, 144, 153, 154

[56] References Cited

U.S. PATENT DOCUMENTS

| | | | |
|---|---|---|---|
| Re. 35,725 | 2/1998 | Briesacher et al. | 96/108 X |
| 2,199,258 | 4/1940 | Gray | 96/134 X |
| 3,242,641 | 3/1966 | Makin, Jr. | 95/117 |
| 3,467,493 | 9/1969 | Eguchi et al. | 95/117 X |
| 3,871,827 | 3/1975 | Seiler et al. | 96/131 X |
| 3,944,403 | 3/1976 | Simpson et al. | 96/131 |
| 4,402,717 | 9/1983 | Izumo et al. | 96/144 X |
| 4,713,224 | 12/1987 | Tamhankar et al. | 423/219 |
| 4,769,053 | 9/1988 | Fischer, Jr. | 96/144 X |
| 4,826,516 | 5/1989 | Matsuoka et al. | 96/121 X |
| 5,091,358 | 2/1992 | Birbara et al. | 95/117 X |
| 5,186,727 | 2/1993 | Chang | 95/117 |
| 5,489,327 | 2/1996 | Otsuka et al. | 95/117 X |
| 5,505,769 | 4/1996 | Dinnage et al. | 96/154 X |
| 5,536,302 | 7/1996 | Golden et al. | 96/153 X |

FOREIGN PATENT DOCUMENTS

| | | | |
|---|---|---|---|
| 3-075202 | 3/1991 | Japan | 95/117 |
| 2177079 | 1/1987 | United Kingdom | 95/117 |

*Primary Examiner*—Robert Spitzer
*Attorney, Agent, or Firm*—Brown, Martin, Haller & McClain, LLP

[57] ABSTRACT

A process, composition and apparatus for the removal of water from moist non-corrosive gases (such as those containing oxygen or $CO_2$) down to $\leq$10–20 ppb water concentration are described. The dehydrating agent is an oxide or salt of an electropositive metal and has a surface area of at least 140 $m^2/g$, preferably 140–500 $m^2/g$, is compatible with the gas, and preferably is capable of dehydrating such gases to $\leq$1 ppb, preferably to as low as 500 ppt. The electropositive metal will be a Group 3b, 4b or lanthanide metal or vanadium. The preferred agent is a high surface area titania, zirconia, yttria or vanadia, with titania most preferred. The dehydrating agent can be in the form of a pelleted or granular bulk material or a coating on or within the pores of a substrate. The agent is retained in a simple container which is easily installed in a gas supply line for the gas, such as to a gas- or vapor-deposition manufacturing unit. The dehydration process can be operated for long periods of time in the presence of these gases. The invention can be used to provide final dehydration to gas streams intended for gas- or vapor-deposition formation of high purity electronic, prosthetic, pharmaceutical, optical fiber or similar products, and can be used in combination with a preliminary dehydration process for such gases upstream of a solid particulate removal unit or molecular contaminant elimination unit downstream.

21 Claims, 1 Drawing Sheet

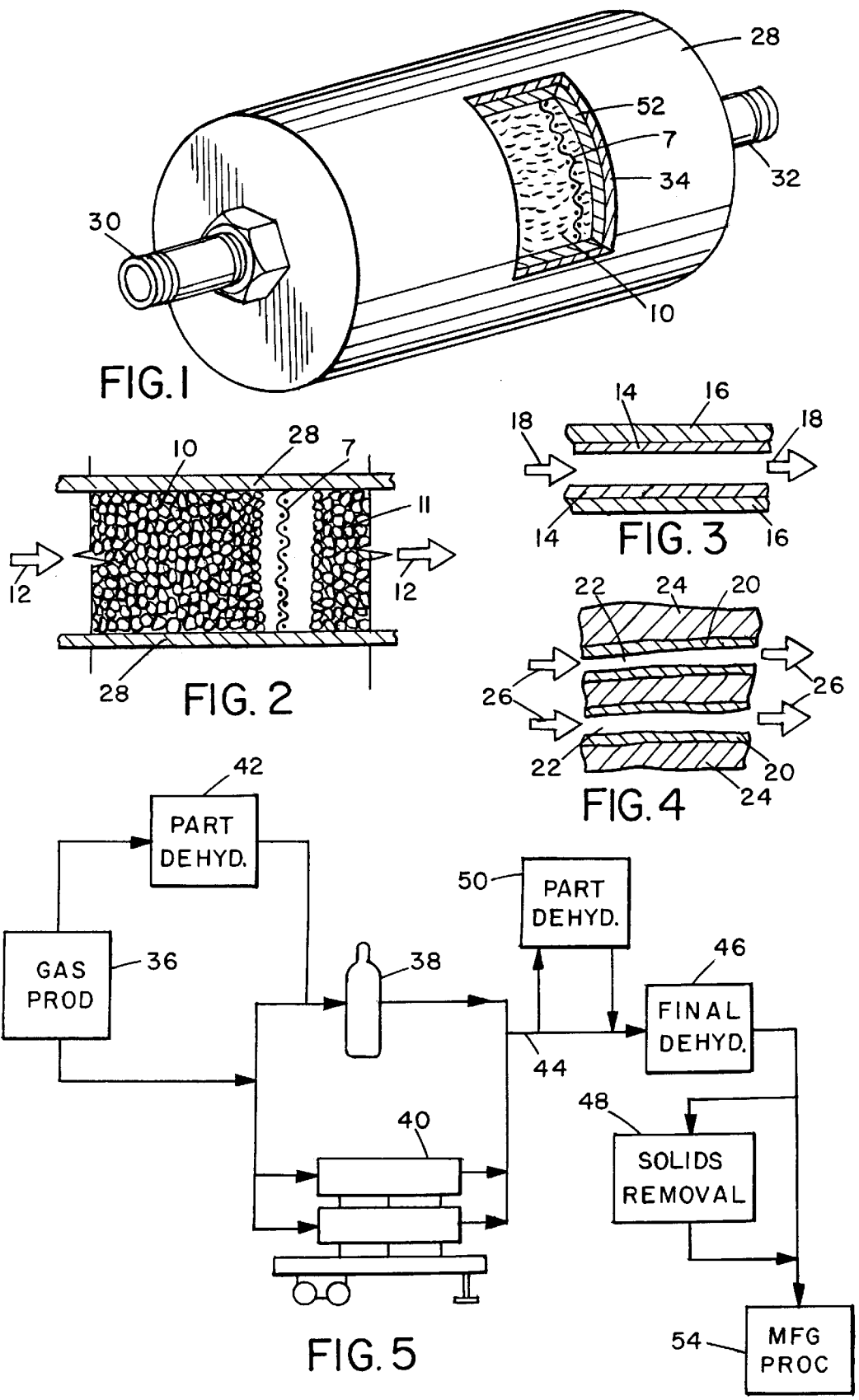

METHOD, COMPOSITION AND APPARATUS FOR WATER REMOVAL FROM NON-CORROSIVE GAS STREAMS

BACKGROUND OF THE INVENTION

1. Field of the Invention

The invention herein relates to the removal of water from streams of non-corrosive gases, such as oxygen. More particularly it relates to the production of substantially water-free non-corrosive gas streams for use in the production of semiconductors, pharmaceuticals, optical fibers and similar products which cannot tolerate the presence of significant quantities of water during their manufacture.

2. Descrption of the Prior Art

There are many products which must be made in an ambient atmosphere containing non-corrosive gases, particularly oxygen. In some cases the gas stream may be entirely the specific non-corrosive gas, or in others it may be a mixture of that gas and other high purity gases or vapors, such as elemental materials and compounds which are to be deposited from the gaseous or vaporous state to form the desired product. Typically such gas/vapor streams are used in the manufacture of high purity products such as silicon wafers for semiconductors or other electronic substrates, semiconductor layer circuitry, prosthetic products for human and animal usage, pharmaceuticals, optical fibers and optical fiber devices. In order for the products to be of high purity, the gases fed to the deposition chamber must be themselves of high purity. The presence in the gas of particulates or, most importantly, water, can substantially reduce the yield of useful products from the manufacturing process.

Water is one of the most common and yet most difficult impurities to remove from the gases. Water is of course ubiquitous in almost all ambient environments. Even systems which are nominally referred to as "dry" usually have significant amounts of water, and many drying processes can reduce the moisture content of a gas only to a "minimum" which is still in the parts per million (ppm) range. However, since for many purposes water contents in the ppm range are quite acceptable, there are numerous patents and articles in the literature dealing with such types of "ppm drying processes."

In the manufacture of the above-mentioned high purity products, however, moisture contents of the depositing gases which are in the ppm range are excessively wet. To form satisfactory products, the water content of the depositing gases must be reduced to the parts per billion (ppb) range, usually down to no more than about 10 ppb. For some products, it is preferably to reduce the water content even lower, down to 5 ppb, 1 ppb or less.

(For brevity in the description in this specification, the gases which can be dehydrated by this invention will be exemplified by discussion of oxygen. It will be understood, however, that the invention is application to a number of other gases, which will be indicated below.)

There exist numerous prior art processes which can remove water down to at least the 1 ppm or 100 ppb level from oxygen gas. However, when seeking to dry oxygen streams below that level, down into the low ppb range, the typical prior art materials have been ineffective. Commonly water in the oxygen rapidly degrades the efficiency of the dehydrating agent, such that while satisfactory dehydration occurs initially, within a short time the degree of dehydration begins to decline, so the water content of the oxygen stream starts to increase and quickly reaches an unacceptable level. At that point a fresh quantity of dehydration agent must be inserted into the gas stream. This is typical, for instance, for many molecular sieve (zeolite) materials as well as compounds such as silica and alumina. The short service life of the agent makes such dehydration a costly and inefficient procedure.

Other materials which might initially be thought to be adequate adsorbers of water from gas streams based on small scale laboratory tests have been found to have too little surface area to be efficient dehydration agents on a commercial or industrial scale. Such materials become saturated very quickly and must be replaced frequently, even though the material itself is unaffected by the oxygen.

Consequently, the problem of removal of moisture down to the order of about 10–20 ppb or less from oxygen or oxygen-containing gas streams remains a significant problem in the field of large-scale commercial and industrial production of high purity semiconductors, substrates, prosthetics, ceramics, optical fibers, pharmaceuticals and the like. Those processes which are being used are expensive because of the very short service life of the dehydrating materials and the need for their frequent replacement. In addition, since it is difficult to determine the exact rate of deterioration of the dehydrating materials in the presence of the oxygen gas, user of such dehydrating materials must schedule their discard and replacement at intervals less than the shortest expected service life. To do otherwise would risk failure of a dehydrating unit with the resultant loss of contaminated product when the excessive moisture reaches the production chamber through the failed unit. Consequently, the current systems require that many if not most of the dehydrating units must be discarded while they still have some degree of useful service life left, thus further increasing the expense of the system operations.

SUMMARY OF THE INVENTION

We have now developed a unique and highly effective process for the removal of water from water-containing (i.e., "moist" or "moisture-containing") non-corrosive gas streams, most importantly oxygen and oxygen-containing gas streams down to concentrations on the order of 10–20 ppb or less. This dehydration process can be operated for long periods of time in the presence of these gases, since the critical material used as the dehydration agent is not susceptible to degradation in the presence of the gases. The invention also includes apparatus for containing the agent, and which is adapted to be mounted in a gas conduit through which the gas is passed to the reaction or product formation chamber.

For the purposes herein, it will be understood that the terms "non-corrosive gas streams" or "oxygen or oxygen-containing gas streams" refer to a stream of substantially pure gas or one in which such gas is mixed with one or more other gases which are themselves non-reactive with the water-containing and which are inert toward the dehydration agent. Excluded from this system are those gas mixtures where one or more of the gases other than the non-corrosive gas is reactive, alone or in the presence of moisture, with the dehydration agent or a component thereof.

In particular, we have discovered that oxides and salts of certain electropositive metals (Group 3b metals, Group 4b metals, lanthanide metals and vanadium) which have an affinity for water and a surface area of at least about 140 $m^2/g$ can be used very effectively to reduce water content of noncorrosive gases (such as oxygen or oxygen-containing gases) to the order of 10 ppb or lower, often down to at least 5 ppb, and in many cases down to 1 ppb or lower. The oxides and salts must be compatible (i.e., nonreactive) with all gases in the gas stream to be dried. Surface areas are preferably in the range of 140–500 $m^2/g$, commonly in the range of 140–250 $m^2/g$. Among the various oxides and salts which are useful herein as dehydration agents are titania, zirconia, yttria and vanadia, of which the most preferred is a high surface area titania. (For brevity herein titania will frequently be used as the example of the oxides and salts, but it will be understood that the descriptions below will be equally applicable to all members of the oxide and salt class defined herein.)

Non-corrosive gases which can be dehydrated by the materials and process of this invention include, but are not limited to, oxygen, hydrogen, nitrogen, carbon monoxide, carbon dioxide, gaseous hydrocarbon gases such as methane and ethane, fluorocarbon gases such as $CF_4$, $C_2F_6$ and $C_3F_8$, and "inert" gases such as argon, neon and helium, as well as mixtures thereof. Other applicable non-corrosive gases will readily be recognized by those skilled in the art, and those are intended to be included herein as well.

Generally the dehydrating agent is used in the form of pellets (usually formed by extrusion), but other forms such as coating, powders, granules, etc. are also useful. Commonly the agent is contained in a simple container or canister which is easily installed in the gas supply line to the reaction or manufacturing facility, such as a gas- or vapor-deposition chamber. The container itself is made of a gas-resistant metal or with a gas-resistant lining, so that the housing itself is not susceptible to degradation and thus does not become the limiting factor in the service life of the system.

Some forms of the titania preferred for use in the present invention (i.e., those at the lower end of the surface area range) have been commercially available from Engelhard Minerals and Chemicals Corporation for use as a catalyst in petrochemical production, particularly for olefin transformation. However, we believe that the use described herein as a non-corrosive gas dehydration agent represents a new and unique process, one never before described or contemplated by those skilled in the art. We have discovered that in the use herein as an dehydration agent, the described high surface area metal oxides and salts, and particularly the described titania, are unique in this function. These agents cannot be replaced by any low surface area materials, although such other materials might be considered equivalent in other, unrelated processes.

Therefore, in one broad embodiment, the invention is of a method of removing water from a stream of moist non-corrosive gas which comprises passing the gas stream over or through a quantity of a compatible oxide or salt of an electropositive Group 3b or 4b or lanthanide metal or vanadium, the oxide or salt having a surface area of at least 140 $m^2/g$, preferably 140–500 $m^2/g$, and commonly 140–250 $m^2/g$, for a period of time sufficient to reduce the water content of the gas stream to the order of about 10 ppb or less.

Preferably the high surface area metal oxide or salt will be a high surface area titania. However, numerous other gas-compatible metal oxides or salts with adequate surface areas will be also satisfactory. Examples include oxides such as zirconia, yttria and vanadia.

The degree of dehydration which is to be accomplished will vary depending on the product being formed. For instance, in the production of semiconductors levels of about 10 ppb are needed, and levels of <1 ppb are desirable. On the other hand, for some pharmaceuticals and optical fiber products, levels of 10–20 ppb can be tolerated and further dehydration is not needed.

The dehydration agent is preferably in the form of pellets (commonly formed by extrusion) which may be porous, and the stream of non-corrosive gas flows over and through the pellets; in the form of powders, granular particles or the like through which the gas flows; or in the form of a coating on the surface of a solid substrate or within the pores of a porous solid substrate, and dehydration of the gas stream occurs as the gas stream is passed over the agent for a period of time sufficient to reduce the water content of the gas stream to the desired level.

In another broad embodiment, the invention is of a composition for the removal of water from a stream of moist non-corrosive gas which comprises a quantity of a gas-compatible oxide or salt of an electropositive Group 3b or 4b or lanthanide metal or vanadium, the oxide or salt having a surface area of at least about 140 $m^2/g$, preferably 140–500 $m^2/g$, and commonly 140–250 $m^2/g$, deposited on the surface of or within the pores of a solid substrate, such that the gas flowing over or though the substrate contacts the agent and is thereby dehydrated to a water content of the desired level without causing degradation of the agent.

In yet another broad embodiment, the invention is of apparatus for removing water from a stream of moist non-corrosive gas comprising a container comprising a gas-tight chamber therein, a gas inlet port and a gas outlet port penetrating the container and respectively providing fluid communication for flow of the gas into the chamber from the exterior of the container and out of the chamber to the exterior of the container, and retention means for retaining within the chamber a gas-compatible oxide or salt of an electropositive Group 3b or 4b or lanthanide metal or vanadium, the oxide or salt having a surface area of at least about 140 $m^2/g$, preferably 140–500 $m^2/g$, and commonly 140–250 $m^2/g$, in a quantity sufficient to reduce water content of the stream of gas to not more than 10 ppb as the gas passes through the chamber and therein contacts the metal oxide or salt.

The systems of this invention will be commonly used to provide final dehydration to gas streams intended for numerous gas- or vapor-deposition formation processes, such as those for manufacture of high purity electronic, prosthetic, pharmaceutical, optical fiber and similar products. Commonly one may use a preliminary dehydration process upstream of a system of this invention, to reduce the water content of the gas stream to a level of about 0.5–1.0 ppm, to maximize the efficiency and service life of the system of this invention. A solid particulate removal unit may be placed downstream of the system of this invention, to remove particulate matter from the gas stream, as may one or more units for removal of molecular (e.g., gaseous) contaminants.

BRIEF DESCRIPTION OF THE DRAWINGS

FIG. 1 is an oblique view, partially cut away, of a canister for containment of the titania or other high surface area dehydration agent for use in this invention.

FIG. 2 is a schematic sectional view illustrating a portion of a canister filled with pellets or granules of the dehydration agent in which the moisture-containing gases contact the agent and are dehydrated as they pass through the mass of pellets or granules, with the optional carbon dioxide removal agent also illustrated.

FIG. 3 is a schematic sectional view illustrating coating of the high surface area agent on a substrate and use of the coated substrate in the process of this invention to dehydrate the moisture-containing gases as they pass over and contact the coating of the agent.

FIG. 4 is a schematic sectional view illustrating a porous substrate which has coated on the interior walls of its pores the high surface area agent, which contacts the moisture-containing gases as they pass through the substrate and contact the coating.

FIG. 5 is a block diagram illustrating the use of the present invention in a gas dehydrating system for a gas- or vapor-deposition manufacturing process.

DETAILED DESCRIPTION AND PREFERRED EMBODIMENTS

The critical aspect of the present invention is the use of a high surface area metal, metal oxide or metal salt as a dehydrating or drying agent for removal of water from non-corrosive gases such as oxygen or oxygen-containing gas streams down to a water concentration level no greater than on the order of 10–20 ppb or less for extended periods of time. Our work leading to this invention considered a wide variety of materials known to have some dehydration ability, many of which have been considered equivalent to the claimed agents for other purposes. However, we have found that these did not maintain active and effective water removal over reasonable service lives. Some materials were rapidly oxidized, while others worked effectively immediately after startup but began to saturate rapidly and soon became ineffective.

It will be recognized in considering this invention that "effectiveness" for the purpose of the invention means the ability to remove sufficient water from the gas stream that the residual water content of the treated gas after contact with the titania in the dehydrating device is no more than about 10–20 ppb, preferably no more than 1 ppb, and most preferably no more than 500 ppt. While the prior art has taught various "purification" or "dehydration" processes, those systems have been limited in that either the gases in question were inert toward the dehydrating materials, that rate of moisture removal was modest, or the systems were designed for frequent removal and replacement of moisture-saturated material. Thus, with respect to the present invention, a material's mere ability to reduce water content to a desired level is not sufficient for usage; the material must also be able to function in the presence of the non-corrosive gases, particularly oxygen, that it can be used for extended service periods of at least 12–24 months of maintaining no more than 10–20 ppb moisture content (or less, usually significantly less) in the exit gases.

The gases to which the present invention is applicable include a wide range of gases which are non-corrosive in the presence of water. These include, but are not limited to, oxygen, hydrogen, nitrogen, carbon monoxide, carbon dioxide, gaseous hydrocarbons such as methane and ethane, fluorocarbon gases such as $CF_4$, $C_2F_6$ and $C_3F_8$, and Group 8 "inert" gases such as argon, neon and helium, as well as mixtures of such gases. Other applicable non-corrosive gases will readily be recognized by those skilled in the art, and those are intended to be included herein as well. Since the gases must be non-corrosive in the presence of water, gases such as the halide gases are not applicable to this invention, since they are corrosive in the presence of water, notwithstanding that some, such as HCl or $Cl_2$, are non-corrosive when anhydrous.

Our invention resides in the discovery that certain metal oxides and salts with specific properties are unique in this respect. The oxide and salt dehydration agents of this invention will be oxides and salts of electropositive Group 3b metals (scandium, yttrium and lanthanum), Group 4b metals (titanium, zirconium and hafnium), vanadium, and lanthanide metals (cerium, praseodymium, neodymium, samarium, europium, gadolinium, terbium, dysprosium, holmium, erbium, thulium, ytterbium and lutetium). (Promethium and actinium also fall within these groups, but since they are unstable they are not of interest in this invention.).

The oxides and salts will have surface area of at least 140 $m^2/g$ and will be chemically inert to the moisture-containing gases. Specifically, where the gas is oxygen or contains oxygen as a component, the agent must be in its highest oxidation state so that it will not be oxidized to a form which does not have the required surface area and water affinity. For other non-corrosive gases, the requirement is similar— the agent must not be chemically reactive with the gas (or component of a gas mixture) to form a reaction product which does not have the required surface area and water affinity. Further, all agents must be sufficiently physically strong that significant portions will not separate and become entrained in the gas stream.

The agents of this invention will have surface areas of at least 140 $m^2/g$, preferably in the range of 140–500 $m^2/g$, commonly in the range of 140–250 $m^2/g$. There are currently a limited number of commercially available materials with this high level of surface area, and which also meet the other requirements described. It is anticipated that additional suitable materials will become commercially available in the future and it is to be understood that such forthcoming materials are considered to be within the scope of this invention.

Preferably the high surface area metal oxide or salt dehydrating agent will be a high surface area titania. However, numerous other metal oxides or salts, such as zirconia, yttria or vanadia with adequate surface areas will be also satisfactory. The preferred titania has a surface area in the range of 140–250 $m^2/g$ and is a product commercially available from the Engelhard Minerals and Chemicals Corporation as a petrochemical catalyst for olefin transformation reactions.

It is preferred to activate the dehydration agent prior to incorporation into the gas system for dehydration. Activation can be accomplished by heating the high surface area agent in an anhydrous inert gas atmosphere (e.g., $N_2$ or Ar gas) at a temperature of about 250°–425° C. (480–800° F.) for about 24–48 hours. The activating gas itself must be dehydrated prior to the activation procedure.

The titania (and other high surface area dehydration agents) can be used in a variety of different embodiments. In a preferred embodiment, the titania is in the physical form of pellets or large granules, as illustrated in FIG. 2. One can simply pass the gas through a body 10 consisting substantially or essentially of the titania pellets or granules, as indicated by the arrows 12. The titania can also be in the form of a body of comminuted fine powders. However, using such powders will cause a significant pressure drop in the gas stream, so it is preferred to used a powdered form of the titania only in high gas pressure systems. It is thus possible to have different forms of the titania for gas streams of different pressures, by using different physical sizes. With the smaller particle or granule sizes care must be taken to minimize entrainment.

Alternatively, as shown in FIG. 3, the titania can be in the form of one or more sheets 14, alone or coated on a substrate 16, over and/or between which the gas (indicated by the arrows 18) is flowed. Further, as illustrated in FIG. 4, the titania can also be used as a thin coating 20 in the pores 22 of a porous ceramic or other inert solid 24 over which flows the gas to be dehydrated, as indicated by the arrows 26.

Typically the inlet gases for dehydration will have water contents in the range of about 1–2 ppm, with some as low as 500 ppb, and the outlet, dried gases will have water contents no greater than about 10–20 ppb, preferably no greater than 1 ppb, and in some cases as low as 500 ppt or less. In experiments moisture removal down to as low as about 170 parts per trillion (ppt) has been achieved, but such is not necessary in many manufacturing processes. The degree of moisture removal will, as noted above, be determined by the particular manufacturing process for which the dried gases are intended. The various processes such as manufacture of semiconductors, pharmaceuticals, optical fibers, fiber optic devices, prosthetics, etc. commonly have different moisture tolerances. Those skilled in the art will be readily able to use the dehydration agents of this invention in the manner described and obtain the level of dehydration required for the specific products of interest.

In the present invention it is most convenient to have the titania (however configured) to be used in dehydration unit 46 to be contained within an appropriate housing or canister 28, such as shown in FIG. 1. The canister 28 has a gas inlet port 30 and a gas outlet port 32, with the titania 10 retained within the canister 28 in one of the forms described above, as illustrated in the cut-away section of canister wall 34. Typically, for flow lines for various common gas streams to be dehydrated, one will be dealing with gas flow rates in the range of about 0.1–40,000 standard liters of gas per minute (sim) and desired lifetimes in the range of 12–24 months or more. Operating temperatures of the gases may range from 0°–65° C. (32°–150° F.) and maximum inlet pressures to the canister 28 are commonly in the range of about 15–3600 psig ($10^3$–$2.5 \times 10^6$ kPa). While any appropriately sized container may be used, preferred are cylindrical canisters 28 with diameters in the range of about 1–30 in. (2½–75 cm) and lengths of 3–48 in. (10–120 cm). The canister size will be dependent upon the gas flow space velocity, the actual surface area and therefore activity of the titania, and the amount of water to be removed, since it is necessary to have sufficient residence time in the canister 28 to reduce the water content of the gas to or below 10–20 ppb.

It is often advantageous, as shown in FIG. 5, to position a conventional "ppm" dehydration unit 50 (commonly a distillation unit) upstream of the dehydration process 46 of the present invention to provide preliminary reduction of the water content of the gas down to a level in the ppm range, preferably and if possible down to a level of 0.5–1 ppm. This of course will reduce the required residence time for the gas in dehydration 46 and also allow significant extension of the service life of the canister 28 and titania because of the reduced quantities of water which will need to be removed from the gas to get the final water content in the exit gas down to the 10–20 ppb, or preferred $\leq 1$ ppb, level or less before it passes to the product manufacturing process 54.

Where unwanted molecular contaminants may be present in the gas stream (as a further contaminant in a gas stream also containing water and oxygen) it will be convenient to include a contaminant elimination section in dehydration unit 46 downstream of the moisture removal section containing the titania or other high surface area dehydration agent to remove such contaminants. Conventional materials 11 known to be effective against such contaminants, such as molecular sieves, catalysts, resins, and the like, will be chosen based on the nature of the specific contaminants present. Of course the contaminant elimination material must be otherwise inert to the gas stream and must not itself contribute moisture to the stream. Normally before use it will be thoroughly dried. As illustrated in FIGS. 1 and 2, a convenient arrangement for unit 46 with typical gas streams containing such molecular contaminants as well as moisture is to have both the dehydration agent 10 and the contaminant elimination agent 11 in the same canister 28, with the upstream dehydration section filling about 75% of the canister 28 and the remaining downstream 25% containing the contaminant elimination section. The two sections and materials may be separated by a screen or other gas-permeable but particle-impermeable septum 7. Alternatively each material may be within its own gas-permeable container within the canister, with suitable provision to insure that no moisturecontaining or contaminant-containing gas bypasses the containers while passing through the canister. Where it is known that the gas stream to be dehydrated has no significant molecular contaminant content, the material 11 may also be dispensed with.

Also as illustrated in FIG. 5, it will be advantageous to use the process, material and equipment of the present invention in gas production facilities where the original high purity gases are produced for shipment to the ultimate product manufacturers. Commonly, non-corrosive gases (such as oxygen) in bulk are produced by the gas supply companies as at 36 and then loaded into and shipped in familiar steel pressure cylinders 38 or tube trailers 40. This system can be modified by passing the produced gases through a system 42 of the present invention, but which is designed for only partial dehydration, before they are loaded into the cylinders 38 or tube trailers 40 for shipment to the customers. It will be understood that the volume of gas being transferred to the cylinders or trailers by the manufacturer is usually such that it is usually not economically justified to try to reduce the water content down to the final $\leq 10$–20 ppb for delivery to the gas manufacturer's facility. Normally some water is likely to re-enter the gas while being connected to the customer's gas supply system. Also, dehydration to the final level for such a large volume of gas will take longer than is justified when filling large numbers of cylinders 38 or trailers 40. However, the value of usage of the system of this invention is that the cylinders 38 or tube trailers 40 of gas then arrive at the ultimate manufacturers' facilities with a greatly reduced water content, such that they can be attached to the gas feed line 44 and pass through the dehydration unit 46 of the present invention for the final reduction to the water content needed for the production process 54, without requiring an intermediate water reduction step 50. (Such a step may be advantageously used, however, if the gas in cylinders 38 or trailers 40 has not had a prior partial drying in unit 42. Partial dehydration 50 may thus be an alternative to partial dehydration 42, to reduce the amount of water which must be removed in the final dehydration unit 46.)

It is also advantageous in most gas delivery systems to include a solids removal unit 48 either upstream, or preferably downstream of dehydration unit 46, to eliminate any particulate matter which has entered from a cylinder 38 or tube trailer 40 (or some other source), or any particles of the dehydration agent itself which may have become entrained in the dried gas stream. Such solids removal units are conventional.

The containers or canisters 28 which make up the devices of the present invention will be made of stainless steel or other metal which is resistant to oxidation or other attack by the gases, or they can be coated on the inside with an oxidation- or other resistant coating 52, as illustrated in FIG. 1. In most cases these coatings will simply be inert materials which are resistant to oxidation or other attack, but which do not contribute significantly to dehydration of the gas. However, It may be desirable to make the coating 52 on the inside of the container 28 from the titania, so that one can obtain dehydration along the walls of the container 28 in addition to the dehydration occurring in the titania body 10 within the container itself.

As the service time of a system of the present invention continues, the titania becomes slowly deactivated. We have found that the titania can be successfully reactivated by heating it (outside or within the canister 28) at a temperature of about 250°–425° C. (480°–800° F.) for 24–48 hours in a nitrogen purge. This effectively removes any adsorbed water. Caution should be taken, however, if the gases which have been dehydrated has contained components which may have been adsorbed on the surface of the dehydration agent and would be volatilized by the heating. It is also advisable to conduct such a heated nitrogen purge drying when the unit 28 is initially put into service, to remove any residual moisture which may have entered the system while the device was being installed or previously during manufacturing or shipment.

It will be recognized that the invention will be of value with respect to treatment of any non-corrosive gases that are used for deposition of component materials for any type of high purity product where moisture content is detrimental to the product's production. This could include, for instance, production of semiconductors, other electronic devices and circuit boards, certain prosthetic devices for implant in humans or animals, production of high purity substrates or other types of materials for research purposes, pharmaceutical production, production of optical fibers and optoelectronic devices (including lasers) and production of high purity materials that are to be used in extreme environments such as products for use in spacecraft or artificial satellites.

It will be evident from the above that there are numerous embodiments of this invention which, while not expressly stated above, are clearly within the scope and spirit of the invention. The above description is therefore intended to be exemplary only, and the actual scope of the invention is to be defined solely by the appended claims.

We claim:

1. A method of removing water from a stream of moist non-corrosive gas which comprises passing said gas stream over or through a quantity of a gas-compatible oxide or salt of an electropositive metal, said metal oxide or salt having a surface area of at least about 140 m$^2$/g, for a period of time sufficient to reduce the water content of said gas stream to on the order of not more than 10 ppb, said metal oxide or salt being substantially unaffected by said gas and being capable of maintaining such dehydration for an extended period of time.

2. A method as in claim 1 wherein said surface area of said metal oxide or salt is in the range of about 140–500 m$^2$/g.

3. A method as in claim 2 wherein said surface area of said metal oxide or salt is in the range of about 140–250 m$^2$/g.

4. A method as in claim 1 wherein said water content of said gas stream is reduced to not more than 1 ppb.

5. A method as in claim 4 wherein said water content of said gas stream is reduced to not more than 500 ppt.

6. A method as in claim 1 wherein said metal forming said oxide or salt is a Group 3b, Group 4b or lanthanide group metal or vanadium, and said metal oxide or metal salt is an oxide or salt of a Group 3b, Group 4b or lanthanide group metal or vanadium.

7. A method as in claim 6 wherein said metal oxide is titania, zirconia, yttria or vanadia.

8. A method as in claim 7 wherein said metal oxide is titania.

9. A method as in claim 1 wherein said non-corrosive gas is oxygen, hydrogen, nitrogen, carbon monoxide, carbon dioxide, a gaseous hydrocarbon, a fluorocarbon gas, or a Group 8 gas, or mixtures thereof.

10. A method as in claim 9 wherein said gas comprises oxygen or an oxygen-containing gas.

11. A method as in claim 1 wherein said metal oxide or salt comprises a plurality of pellets or granular particles thereof.

12. A method as in claim 1 wherein said metal oxide or salt is present in the form of a coating on the surface or within the pores of a substrate.

13. A method as in claim 1 wherein said gas stream contains a molecular contaminant in addition to water, said method further comprising passing said gas stream through a quantity of a material to eliminate said contaminant after said gas stream has passed through said quantity of said gas-compatible oxide or salt of an electropositive metal.

14. A method of removing water from a stream of moist non-corrosive gas which comprises passing said gas stream over or through a quantity of titania having a surface area of at least about 140 m$^2$/g for a period of time sufficient to reduce the water content of said gas stream to on the order of not more than 10 ppb, said titania being substantially unaffected by oxygen or oxygen-containing gas and being capable of maiataining such dehydration for an extended period of time.

15. A method as in claim 14 wherein said surface area of said titania is in the range of about 140–250 m$^2$/g.

16. A method as in claim 14 wherein said water content of said gas stream is reduced to not more than 1 ppb.

17. A method as in claim 16 wherein said water content of said gas stream is reduced to not more than 500 ppt.

18. Apparatus for removing water from a stream of moist non-corrosive gas comprising a container comprising a gas-tight chamber therein, a gas inlet port and a gas outlet port penetrating said container and respectively providing fluid communication for flow of said gas into said chamber from the exterior of said container and out of said chamber to the exterior of said container, and retention means for retaining within said chamber an oxide or salt of an electropositive metal, said metal oxide or salt having a surface area of at least 140 m$^2$/g, in a quantity sufficient to reduce water content of said stream of gas to on the order of not more than about 10 ppb as said gas passes through said chamber and therein contacts said metal oxide or salt.

19. Apparatus as in claim 18 wherein said metal oxide or salt is in the form or pellets or granules retained within said chamber and said retention means comprises a wall of said chamber.

20. Apparatus as in claim 18 wherein said retention means comprises a solid substrate within said chamber in a gas flow path between said inlet port and said outlet port, said solid substrate supporting a quantity of said metal oxide or salt on the surface or in the pores thereof, said substrate disposed such that said gas flowing through said chamber will pass over or through said solid substrate and contact said metal oxide or salt.

21. Apparatus as in claim 18 further comprising means within said chamber for retaining a quantity of an agent for elimination of a molecular contaminant from said gas disposed between said means for retaining said metal oxide or salt and said outlet port, and further disposed such that all gases passing through said chamber must pass through said quantity of elimination agent after passing through said quantity of said metal oxide or salt.

* * * * *